United States Patent
Wing et al.

(10) Patent No.: US 7,706,371 B1
(45) Date of Patent: Apr. 27, 2010

(54) DOMAIN BASED ROUTING FOR MANAGING DEVICES OPERATING BEHIND A NETWORK ADDRESS TRANSLATOR

(75) Inventors: Daniel G. Wing, San Jose, CA (US);
Shiva J. Shankar, Bangalore (IN);
Ottalingam Satyanarayanan, Fremont, CA (US); William D. Gaskill, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1004 days.

(21) Appl. No.: 11/177,160

(22) Filed: Jul. 7, 2005

(51) Int. Cl.
*H04L 12/56* (2006.01)
*G06F 15/16* (2006.01)
(52) U.S. Cl. .................. 370/392; 370/401; 709/245
(58) Field of Classification Search .............. None
See application file for complete search history.

(56) References Cited

U.S. PATENT DOCUMENTS

| | | | |
|---|---|---|---|
| 6,405,250 B1 | 6/2002 | Lin et al. | |
| 6,708,219 B1* | 3/2004 | Borella et al. | 709/245 |
| 6,822,957 B1* | 11/2004 | Schuster et al. | 370/389 |
| 6,834,310 B2* | 12/2004 | Munger et al. | 709/232 |
| 7,032,242 B1* | 4/2006 | Grabelsky et al. | 726/11 |
| 7,047,314 B2* | 5/2006 | Sato et al. | 709/238 |
| 7,155,518 B2* | 12/2006 | Forslow | 709/227 |
| 7,334,049 B1 | 2/2008 | Somasundaram et al. | |
| 7,349,960 B1 | 3/2008 | Pothier et al. | |
| 7,411,975 B1* | 8/2008 | Mohaban | 370/466 |
| 7,443,859 B2* | 10/2008 | Sengodan | 370/395.3 |
| 2002/0059455 A1* | 5/2002 | Tajiri et al. | 709/245 |
| 2003/0084162 A1* | 5/2003 | Johnson et al. | 709/227 |
| 2004/0249931 A1 | 12/2004 | Garg et al. | |
| 2005/0058132 A1* | 3/2005 | Okano et al. | 370/389 |
| 2005/0105508 A1* | 5/2005 | Saha | 370/352 |
| 2005/0144314 A1 | 6/2005 | Kan et al. | |
| 2005/0195813 A1* | 9/2005 | Ambe et al. | 370/389 |
| 2005/0286519 A1* | 12/2005 | Ravikumar et al. | 370/389 |
| 2006/0029083 A1* | 2/2006 | Kettlewell et al. | 370/401 |
| 2006/0077988 A1* | 4/2006 | Cheng et al. | 370/401 |
| 2006/0149845 A1* | 7/2006 | Malin et al. | 709/228 |
| 2006/0168321 A1* | 7/2006 | Eisenberg et al. | 709/238 |
| 2006/0209794 A1* | 9/2006 | Bae et al. | 370/352 |
| 2006/0256815 A1* | 11/2006 | Kivinen et al. | 370/466 |
| 2006/0259639 A1* | 11/2006 | Aken et al. | 709/245 |

(Continued)

OTHER PUBLICATIONS

U.S. Appl. No. 11/147,713, Wing et al., "Managing devices across NAT boundaries", filed Jun. 7, 2005.*

(Continued)

*Primary Examiner*—Gregory B Sefcheck
(74) *Attorney, Agent, or Firm*—Stolowitz Ford Cowger LLP

(57) ABSTRACT

A domain based tunneling scheme allows a Network Management System (NMS) to manage devices in a private network operating behind a NAT boundary. A device in the private network provides the NMS with information including a public NAT IP address, a private device IP address, and a unique device identifier. The NMS uses the public NAT IP address to set up and maintain a tunnel to the private network. The NMS stores the NAT information and a tunnel identifier in a table entry associated with the device. The NMS then uses the tunnel and the contents of the table entry to conduct management operations with the device operating in the private network.

14 Claims, 14 Drawing Sheets

U.S. PATENT DOCUMENTS

| | | | |
|---|---|---|---|
| 2007/0036143 | A1 | 2/2007 | Alt et al. |
| 2007/0105549 | A1* | 5/2007 | Suda et al. ............... 455/426.2 |
| 2007/0150552 | A1* | 6/2007 | Harris et al. ................ 709/218 |
| 2007/0165629 | A1* | 7/2007 | Chaturvedi et al. ......... 370/389 |
| 2007/0180116 | A1 | 8/2007 | Kim et al. |
| 2008/0126528 | A1* | 5/2008 | Takeda et al. ............... 709/223 |

OTHER PUBLICATIONS

"STUN—Simple Traversal of User Datagram Protocol (UDP) Through Network Address Translators (NATs)", J. Rosenberg et al., Mar. 2003, pp. 1-44.

"Network Address Translation Port Mapping Protocol (NAT-PMP)", Jul. 22, 2004, pp. 1-9.

"Management of NAT-Based Private Networks", O.T. Satyanarayanan, J. Shiva Shankar, Jun. 13, 2005, pp. 1-14.

"Basic Dial NMS Implementation Guide—Overview of Basic SNMP Building Blocks", Aug. 2000, pp. 13-25.

"Maksat Network Management System", Specification Sheet, Reference Manual, and Basic Setup Guide, downloaded Jun. 6, 2005, pp. 1-9, http://www.maksat.cominms.htm (dead link).

Prosecution History for U.S. Appl. No. 11/147,713 filed Jun. 7, 2005, published as U.S. Patent 7,515,549.

* cited by examiner (Background)

(Background)

| Device | Public IP | Tunnel | Unique ID | Private IP |
|---|---|---|---|---|
| IP Phone 18 | NAT 20<br>IP = Z<br>38 | Tunnel (15)<br>49 | IP Phone 18<br>MAC = Q<br>48 | Computer 16B<br>192.168.0.3<br>32 |
| Computer 16A | NAT 20<br>IP = Z | Tunnel (15) | Computer 16A<br>MAC = R | Computer 16A<br>192.168.0.1 |
| Computer 16B | NAT 20<br>IP = Z | Tunnel (15) | Computer 16B<br>MAC = S | Computer 16B<br>192.168.0.2 |

FIG.2B

| Device | Public IP | Tunnel | Unique ID | Private IP |
|---|---|---|---|---|
| Computer 19A | NAT 23A IP = q | Tunnel (80A) | Computer 19A MAC = t | Computer 19A 13A 192.168.0.1 |
| Computer 19B | NAT 23B IP = r | Tunnel (80B) | Computer 19B MAC = u | Computer 19B 13B 192.168.0.1 |
| IP Phone 18 | NAT 20 IP = Z | Tunnel (15) | IP Phone 18 MAC = Q | IP Phone 18 32 192.168.0.3 |
| Computer 16A | NAT 20 IP = Z | Tunnel (15) | Computer 16A MAC = R | Computer 16A 192.168.0.1 |
| Computer 16B | NAT 20 IP = Z | Tunnel (15) | Computer 16B MAC = S | Computer 16B 192.168.0.2 |

FIG.3B

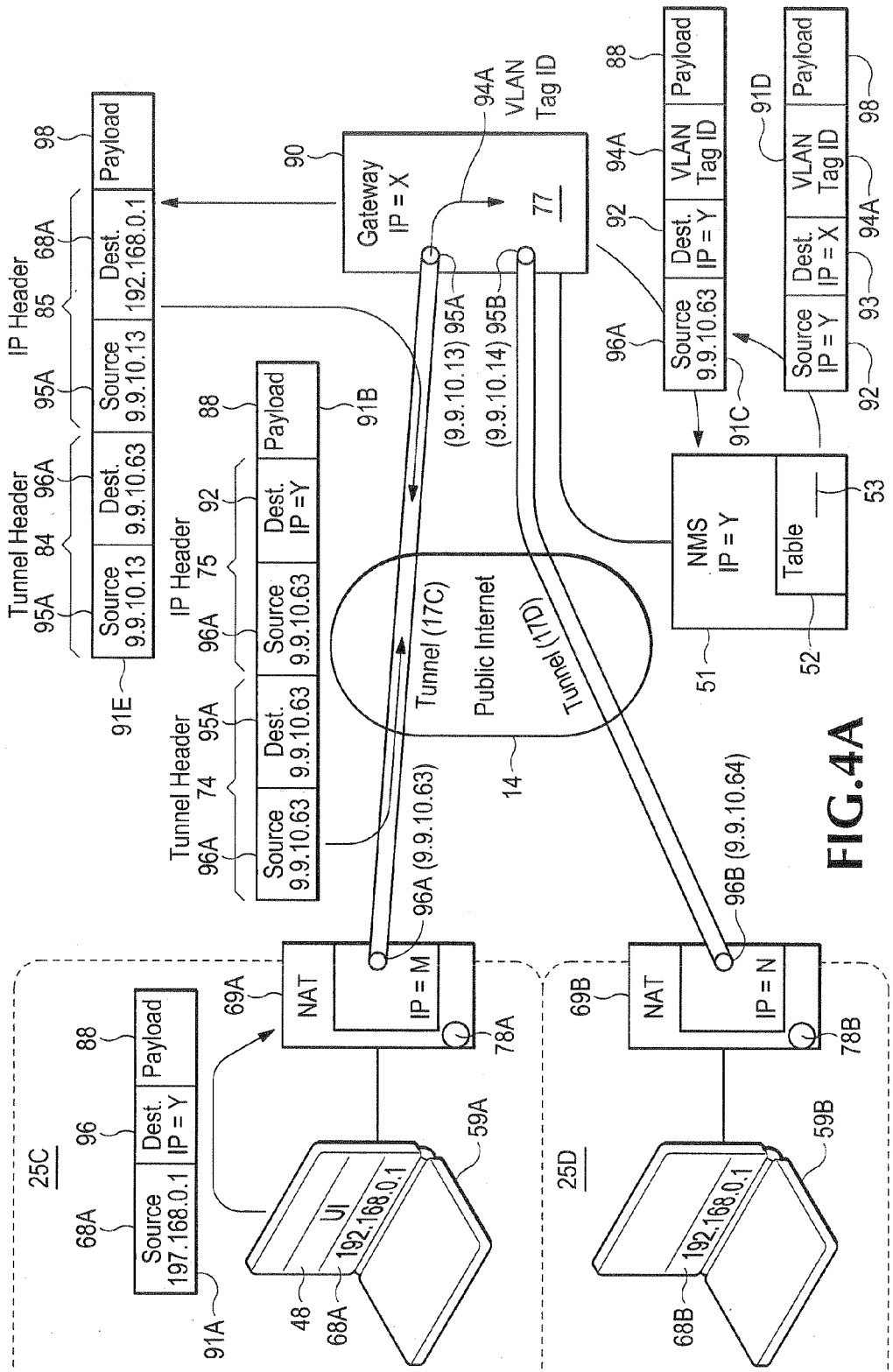

| Device | Public IP | Tunnel | Unique ID | Private IP | VLAN Tag ID |
|---|---|---|---|---|---|
| Computer 59A | NAT 69A IP = M | Tunnel (17C) | Computer 59A MAC = v | Computer 59A 68A 192.168.0.1 | 94A |
| Computer 59B | NAT 69B IP = N | Tunnel (17D) | Computer 59B MAC = w | Computer 59B 68B 192.168.0.1 | 94B |

FIG.4B

DOMAIN BASED ROUTING FOR MANAGING DEVICES OPERATING BEHIND A NETWORK ADDRESS TRANSLATOR

BACKGROUND OF THE INVENTION

This invention relates generally to network management and more particularly to managing devices across Network Address Translator (NAT) boundaries using tunnels.

A Network Management System (NMS) can manage many devices including computers and Internet Protocol (IP) telephones. Management can include network management, changing system settings, recording failures of network devices, discovering what hardware components are installed in network devices, discovering what software is installed on the device, etc.

FIG. 1A shows an NMS 3 used for managing computers 1 and 2. A table 5 stores the IP addresses of the devices managed by the NMS 3. The table 5 is shown in more detail in FIG. 1B and includes entries listing the IP addresses of the computers 1 and 2 managed by NMS 3. The NMS 3 communicates with the computers 1 and 2 using the public IP addresses X and Y, respectively. For example, the NMS uses IP address X in table 5 to communicate with computer 1.

Referring back to FIG. 1A, Network Address Translator (NAT) 20 and computers 16A and 16B reside within a private network 15. The NAT 20 has a public IP address 38 and assigns private IP addresses to computers 16A and 16B. The NAT 20 is designed for IP address simplification and conservation, by enabling the private IP network 15 to use non-registered (private) IP addresses. The NAT 20 operates as a router connecting the private network 15 together with the public network 14. The NAT 20 translates the private (not globally unique) addresses used in the private network 15 into public IP addresses. As part of this functionality, NAT 20 can be configured to advertise only one public address to the public network 14 that represents for the entire private network 15.

For example, computers 16A and 16B communicate over Internet network 14 using the public IP address 38 provided by the NAT 20. The NAT 20 receives a packet 7A from a device on private network 15, such as computer 16A. The packet 7A includes a private source address 8 and a destination IP address 9 for an endpoint such as IP phone 6, packet 7A also includes a payload 10. The NAT 20 reformats packet 7A into a packet 7B that replaces the private source address 8 with the NAT's public IP address 38 and a port number 40 that the NAT 20, associates with computer 16A. The NAT 20 then forwards the reformatted packet 7B to IP phone 6.

The IP phone 6 sends packets (not shown) back to the computer 16A that includes the public IP address 38 and port number 40 for the NAT 20. The NAT 20 receives and forwards the packet from IP phone 6 to computer 16A based on the port number 40.

The NMS 3 cannot manage computers 16A and 16B behind NAT 20 for several reasons. First, the table 5 in NMS 3 only includes public IP device addresses. The NMS 3 does not have the ability to obtain the private IP addresses and port numbers needed for communicating with computers 16A and 16B. Even if the NMS 3 could obtain the private IP addresses and port numbers associated with of computers 16A and 16B, these addresses are not routable from the NMS. Additionally, the private IP addresses may be dynamically reassigned whenever the NAT 20 is reset. Port numbers are also typically refreshed in unison with the private IP address reassignment.

Because of the foregoing limitations, network management servers are unable to manage devices operating in private networks behind NATs. The disclosure that follows solves this and other problems associated with the prior art.

SUMMARY OF THE INVENTION

A domain based tunneling scheme allows a Network Management System (NMS) to manage devices in a private network operating behind a NAT boundary. A device in the private network provides the NMS with information including a public NAT IP address, a private device IP address, and a unique device identifier. The NMS uses the public NAT IP address to set up and maintain a tunnel to the private network. The NMS stores the NAT information and a tunnel identifier in a table entry associated with the device. The NMS then uses the tunnel and the contents of the table entry to conduct management operations with the device operating in the private network.

BRIEF DESCRIPTION OF THE DRAWINGS

FIG. 2B is a table used by the NMS in FIG. 2A.
FIG. 3B is a table used by the NMS in FIG. 3A.
FIG. 4A is a diagram showing how the NMS uses a gateway to manage devices in different private networks.
FIG. 4B is a table used by the NMS in FIG. 4A.

DETAILED DESCRIPTION

Figure 1A:
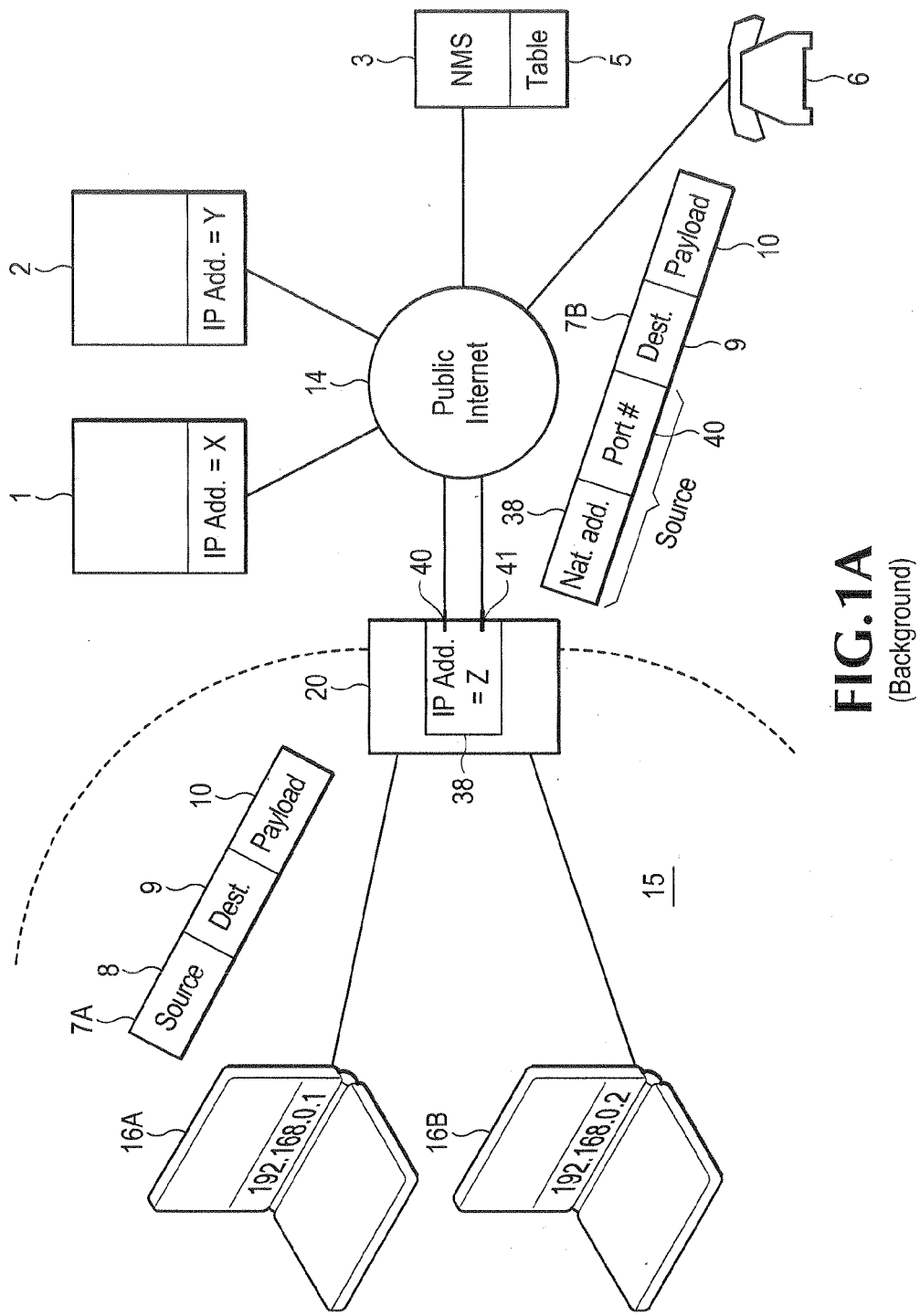
FIG. 1A is a diagram of an NMS managing two devices.
Figure 1B:
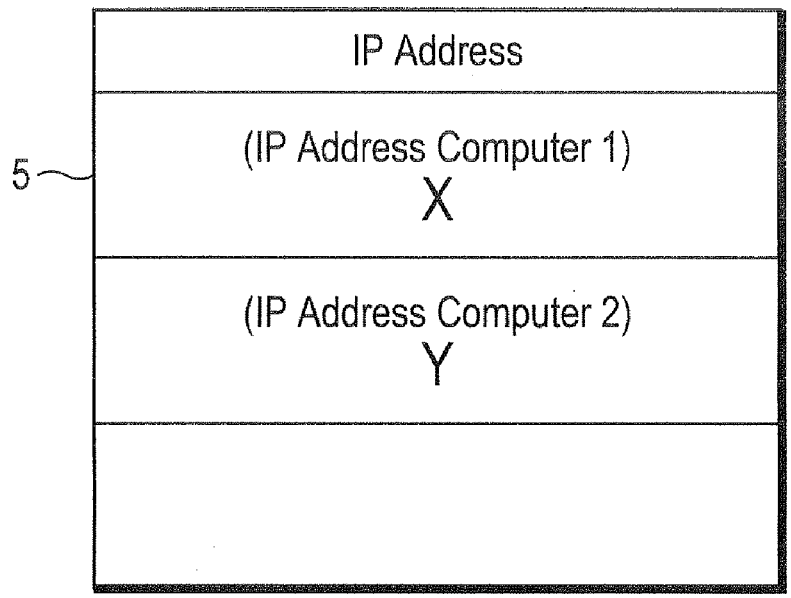
FIG. 1B is a diagram of a table used by the NMS in FIG. 1A.
Figure 2A:
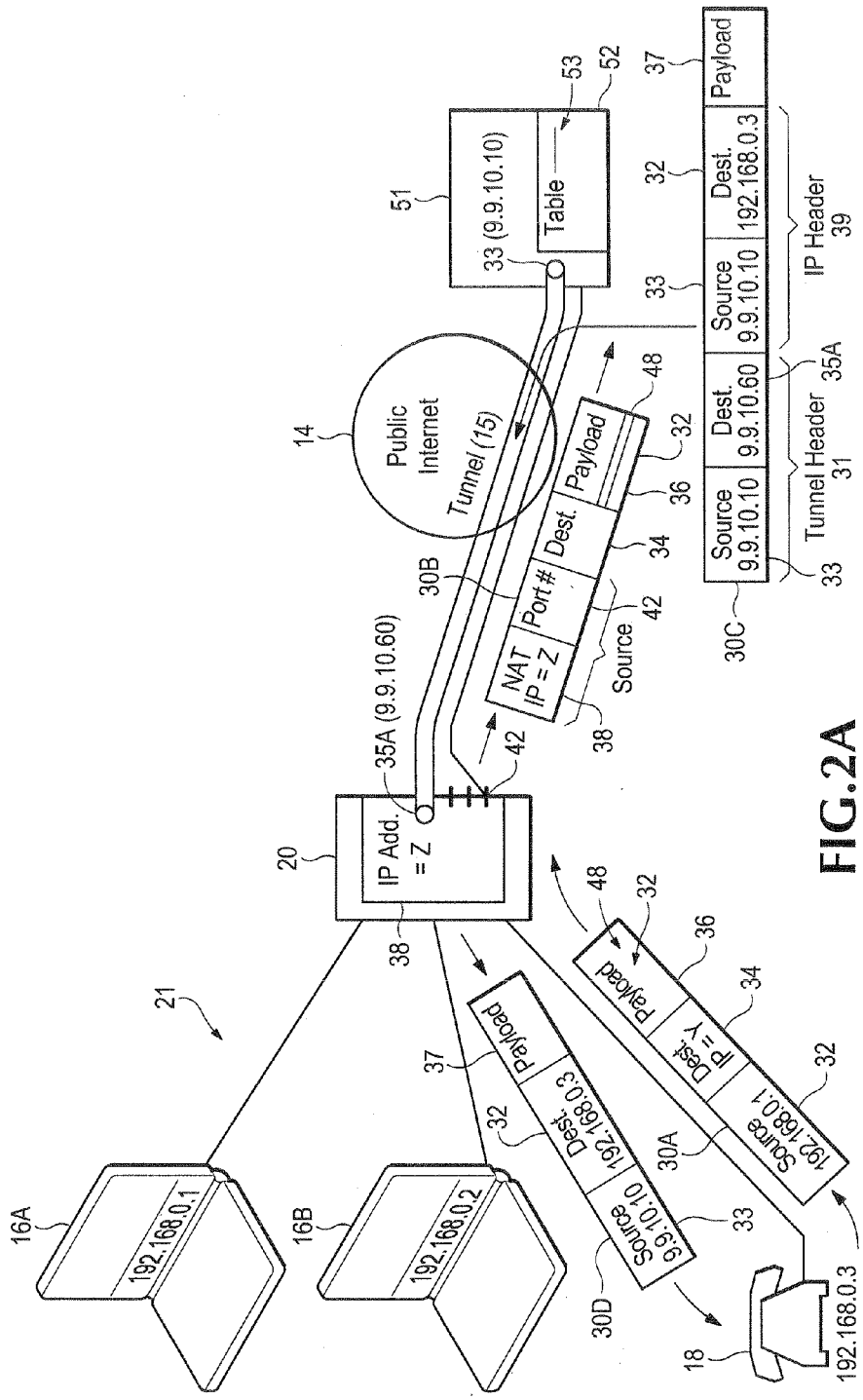
FIG. 2A is a diagram showing an NMS setting up a tunnel and managing a device in a private network through the tunnel.

FIG. 2A shows an NMS 51 that manages devices 16A, 16B, and 18 in a private network 21 defined by NAT 20. The NMS 51 includes a table 52 that includes address information associated with devices 16A, 16B, and 18. The NMS 51 utilizes the information in table 52 in conjunction with domain based routing and tunneling to send management communications to 16A, 16B, and 18.

Any of the devices 16A, 16B, or 18 can be managed by NMS 51. However, the example better describes IP phone 18 being managed by NMS 51. The IP phone 18 generates a packet 30A that includes a private source address 32 for the IP phone 18 and a destination address 34 for the NMS 51. Packet 30A also includes a payload 36 that contains a private IP address 32 and a unique identifier 48 for the IP phone 18. The unique identifier 48 may be a MAC address, certificate, user name, or any other identifier that is unique to IP phone 18.

The NAT 20 receives and reformats packet 30A into packet 30B. Packet 30B replaces the source address 32 with the public IP address 38 for NAT 20 and the port number 42 that NAT 20 associated with IP phone 18. The NAT 20 then forwards the reformatted packet 30B to the NMS 51.

The NMS 51 receives packet 30B and adds an entry 53 for IP phone 18 into table 52. The table 52 is shown in more detail in FIG. 2B. Entry 53 includes the public NAT IP address 38, the private IP address 32 of the IP phone 18, a unique identifier 48 for the IP phone 18, and a tunnel identifier 49. The tunnel identifier 49 is entered once the NMS 51 sets up a tunnel to private network 15. The NMS 51 gets the public NAT IP address 38 from the source field of packet 30B (FIG. 2A). The NMS 51 gets the private IP address 32 and the unique device identifier 48 from the payload 36 in packet 30B.

The NMS 51 may have outdated contact information for devices 18, 16A and 16B in table 52. The unique identifier, 48, in one example is a Media Access Control (MAC) address and allows the NMS 51 to still reliably access the different devices. For example, the NAT 20 can frequently reassign private device IP addresses 32 to the different devices 18, 16A and 16B but will not vary their unique identifiers 48. If NAT 20 is rebooted for instance, NAT 20 may reassign private device IP addresses to devices 18, 16A and 16B. Even if NAT 20 swaps the private device IP addresses assigned to IP phone 18 and computer 16A, NMS 51 will still be able to access the devices using their associated MAC addresses 48 in table 52.

Returning still to FIG. 2A, the NMS 51, when managing IP phone 18, sets up a tunnel 15 to private network 21. Tunnel 15 in this example has endpoint 33 at IP address 9.9.10.10 and endpoint 35A at IP address 9.9.10.60. The NMS 51 also populates the tunnel identifier 49 for entry 53 in FIG. 2B with identifier tunnel 15.

To manage IP phone 18, the NMS 51 prepares packet 30C. Packet 30C includes a tunnel header 31 with a source address 33 for tunnel endpoint 33 and a destination address 35A for tunnel endpoint 35A at NAT 20. Packet 30C also includes an IP header 39 with a source address for tunnel endpoint 33 and a destination IP address 32 for IP phone 18. Packet 30C also includes payload 37 that contains management communications for IP phone 18.

Packet 30C is sent through tunnel 15 to endpoint 35A. The NAT 20 removes the tunnel header 31 forming packet 30D. Packet 30D includes the source address 33 for NMS 51, the destination IP address 32 for IP phone 18, and payload 37. The IP phone 18 receives packet 30D from NAT 20 and processes the payload 37. In one embodiment, the payload 37 includes management instructions compliant with a Simple Network Management Protocol (SNMP) that are executed by the IP phone 18.

The IP phone 18 may also periodically run local processes to determine whether the private IP address 32 has been reassigned to another device or whether the unique identifier 48 has changed. The local processes will be described in more detail below. If the private IP address 32 or the unique identifier 48 has changed, the IP phone 18 updates the NMS 51 with the current information by sending another packet similar to packet 30A.

The updates can also notify the NMS 51 when the public NAT IP address 38 has changed, for example, due to an expired IP address lease. The NMS 51 is notified of the change to the public NAT IP address 38 when the NAT 20 inserts the new public NAT IP address 38 into the source field of the update packet 30B.

Figure 3A:
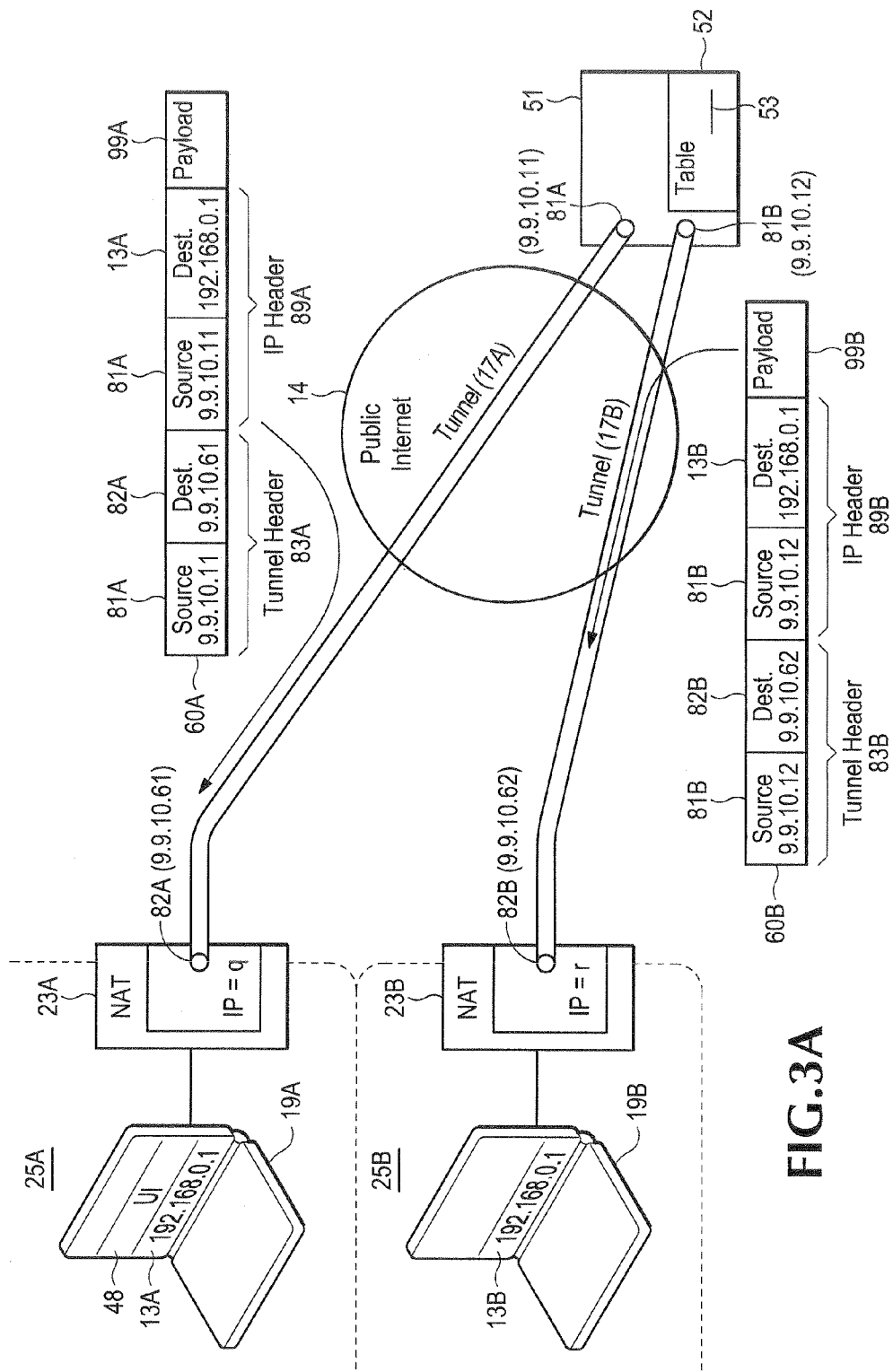
FIG. 3A is a diagram showing the NMS setting up two tunnels and managing two devices in different private networks.

FIG. 3A shows how the NMS 51 manages two devices with the same private IP address using domain based tunneling. Computer 19A and computer 19B reside in different private networks 25A and 25B, respectively. In this example, NAT 23A has assigned computer 19A the private IP address 192.168.01 and NAT 23B has assigned computer 19B the same IP address 192.168.0.1.

Computer 19A sends the private IP address 192.168.0.1 and associated unique identifier 48 to NMS 51 (not shown). The NMS 51 adds an entry 53 for computer 19A into table 52 and associates computer 19A with a tunnel identifier 17A in the table 52. Table 52 is shown in more detail in FIG. 3B.

Computer 19B provides the private address and unique identifier information to the NMS 51 in the same manner as computer 19A. NMS 51 accordingly sets up another tunnel 17B for managing computer 19B. The private IP address values of computers 19A and 19B are the same in this example. However, the tunnels connecting to private networks 25A and 25B are different. This allows the NMS 51 to uniquely access computers 19A and 19B. For example, NMS 51 sends packet 60A when managing computer 19A. Packet 60A includes a tunnel header 83A containing source address 81A and destination address 82A. Packet 60A also includes an IP header 89A containing source address 81A and a destination address 13A. Packet 60A also includes payload 99A that contains management instructions.

Packet 60A travels through tunnel 17A until it reaches tunnel endpoint 82A. The NAT 23 removes the tunnel header 83A and delivers the remaining part of the packet to computer 19A based on IP destination address 13A. Computer 19A then processes the management information in payload 99A.

The NMS 51 sends packet 60B to manage computer 19B. Packet 60B includes a tunnel header 83B with a source address 81B and a destination address 82B. Packet 60B also includes an IP header 89B with source address 81B, destination address 13B, and a payload 99B containing management instructions.

Packet 60B travels through tunnel 17B until it reaches tunnel endpoint 82B. The NAT 23B removes the tunnel header 83B and delivers the remaining portion of the packet to computer 19B based on the destination address 13B in the IP header 89B. Computer 19B then processes the management information in payload 99B.

FIG. 4A shows another embodiment of the system that uses a gateway 90 to relieve the NMS 51 from the processing burden of setting up and maintaining tunnels. Tunnel 17C is established between NAT 69A and gateway 90. In one embodiment, NAT 69A includes an Easy VPN Remote 78A (available from Cisco Systems) and gateway 90 includes an Easy VPN Server 77 (available from Cisco Systems). The Easy VPN Remote 78A is configured to initiate a tunnel 17C from NAT 69A to gateway 90. Other embodiments use Dynamic Multipoint VPN or any other method to initiate tunnel 17C. Gateway 90 maintains a mapping of tunnel 17C, and is configured to tag any packets that arrive from tunnel 17C with an identifier 94A. The identifier 94A is a VLAN tag (802.1q).

After tunnel 17C has been established, computer 59A sends an update packet 91A to NMS 51. Packet 91A includes source address 68A and destination address 92. Packet 91A also includes a payload 88 that contains a private IP address 68A and a unique identifier 48 for the computer 59A. NAT 69A receives a packet 91A and sends packet 91B over tunnel 17C. Packet 91B includes a tunnel header 74 with source address 96A and destination address 95A and an IP header 75 with source address 96A and destination address 92. Packet 91B also includes payload 88.

Packet 91B travels through tunnel 17C until it reaches tunnel endpoint 95A at gateway 90. Gateway 90 removes the tunnel header 74 and tags packet 91B with the VLAN tag identifier 94A to create packet 91C. Packet 91C is sent to NMS 51. The NMS 51 receives the information and adds an entry 53 for computer 59A into table 52. Entry 53 associates computer 59A with VLAN tag identifier 94A. Table 52 is shown in more detail in FIG. 4B To manage computer 59A, the NMS 51 sends packet 91D with VLAN tag identifier 94A and payload 98 to gateway 90. Payload 98 includes instructions for managing computer 59A. Gateway 90 receives packet 91D and determines the appropriate tunnel 17C based on VLAN tag identifier 94A. Packet 91E is formed to travel over tunnel 17C. Packet 91E includes a tunnel header 84 with source address 95A and destination address 96A and an IP header 85 with source address 95A and destination address 68A. Packet 91E also includes payload 98 that includes instructions for managing computer 59A.

Packet 91E travels through tunnel 17C until it reaches tunnel endpoint 96A at NAT 69A. NAT 69A removes the tunnel header 84 and delivers the remaining packet portion to computer 59A. Computer 59A then processes the management information in payload 98.

Figure 5:
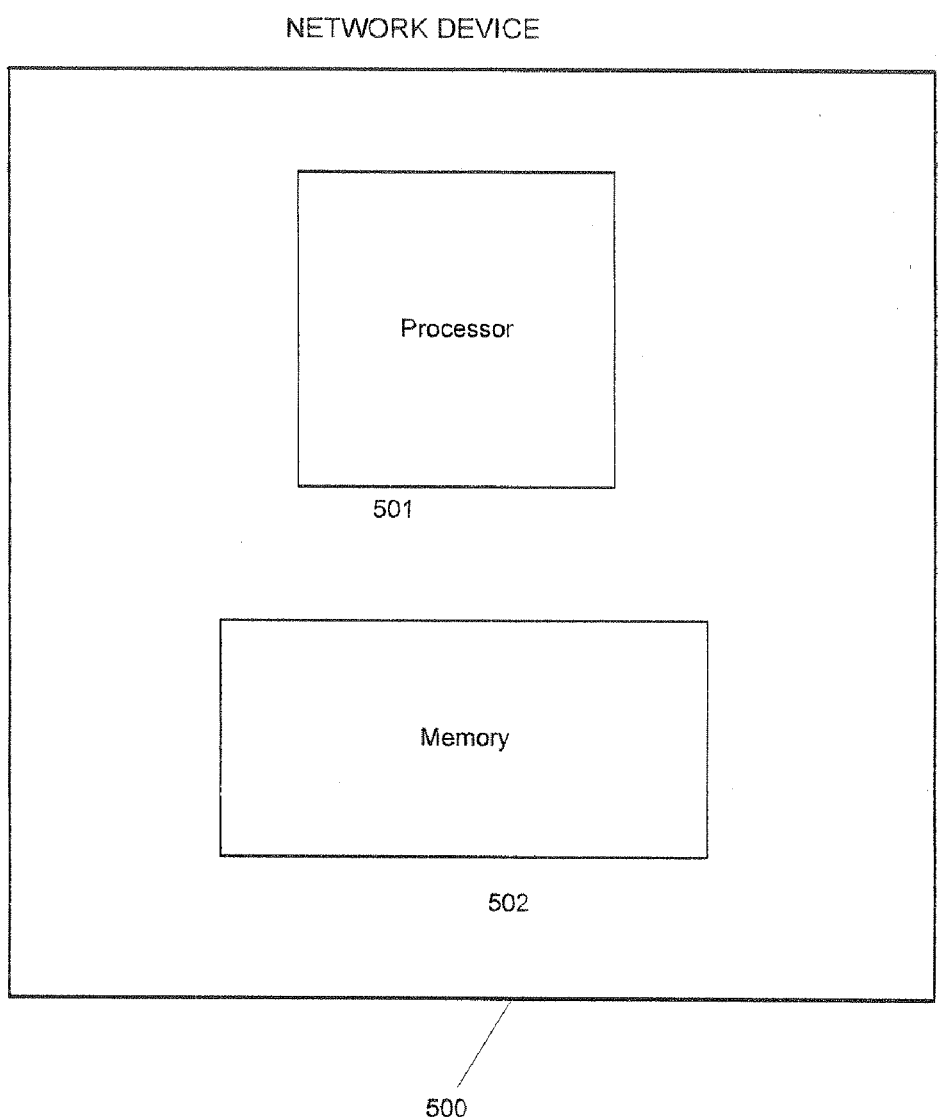
FIG. 5 is a diagram showing in more detail the device operating in the private network.
Figure 6:
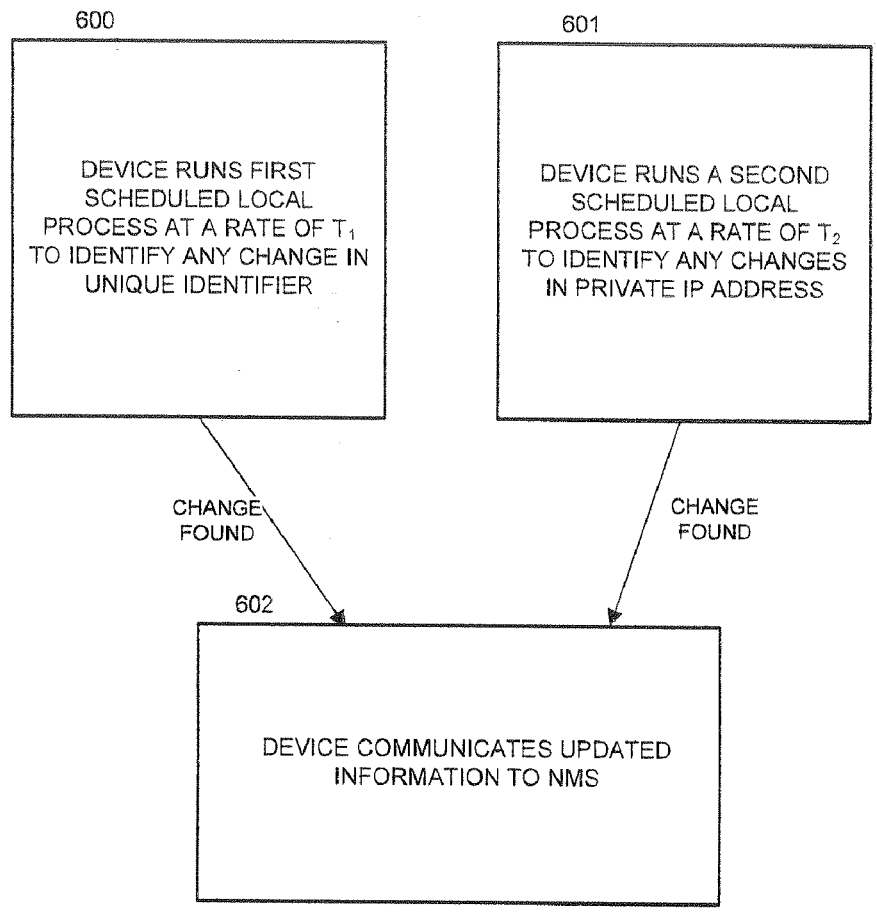
FIG. 6 is a flowchart showing how the device in the private network operates.

FIGS. 5 and 6 describe a device 500 that provides contact information to an NMS. The device 500 includes a processor 501 and a memory 502. The memory 502 includes instructions that, when executed by the processor 501, perform the functions described in the flowchart of FIG. 6.

Referring to FIG. 6, the device 500 runs two scheduled local processes to determine whether a private device IP address or a unique device identifier has changed. Since the unique device identifier is relatively static in this embodiment, the device in block 600 runs a first scheduled local process at a rate of $T_1$ to determine if the unique identifier has changed. The device 500 runs a second scheduled process in block 601 at a rate of $T_2$ to determine whether the private device IP address has changed. In one example, rate $T_2$ is more frequent that rate $T_1$. If a change in the unique identifier or private IP address is detected, the device 500 udpates the NMS in block 602 by sending an update packet 30A (FIG. 2A).

Figure 7:
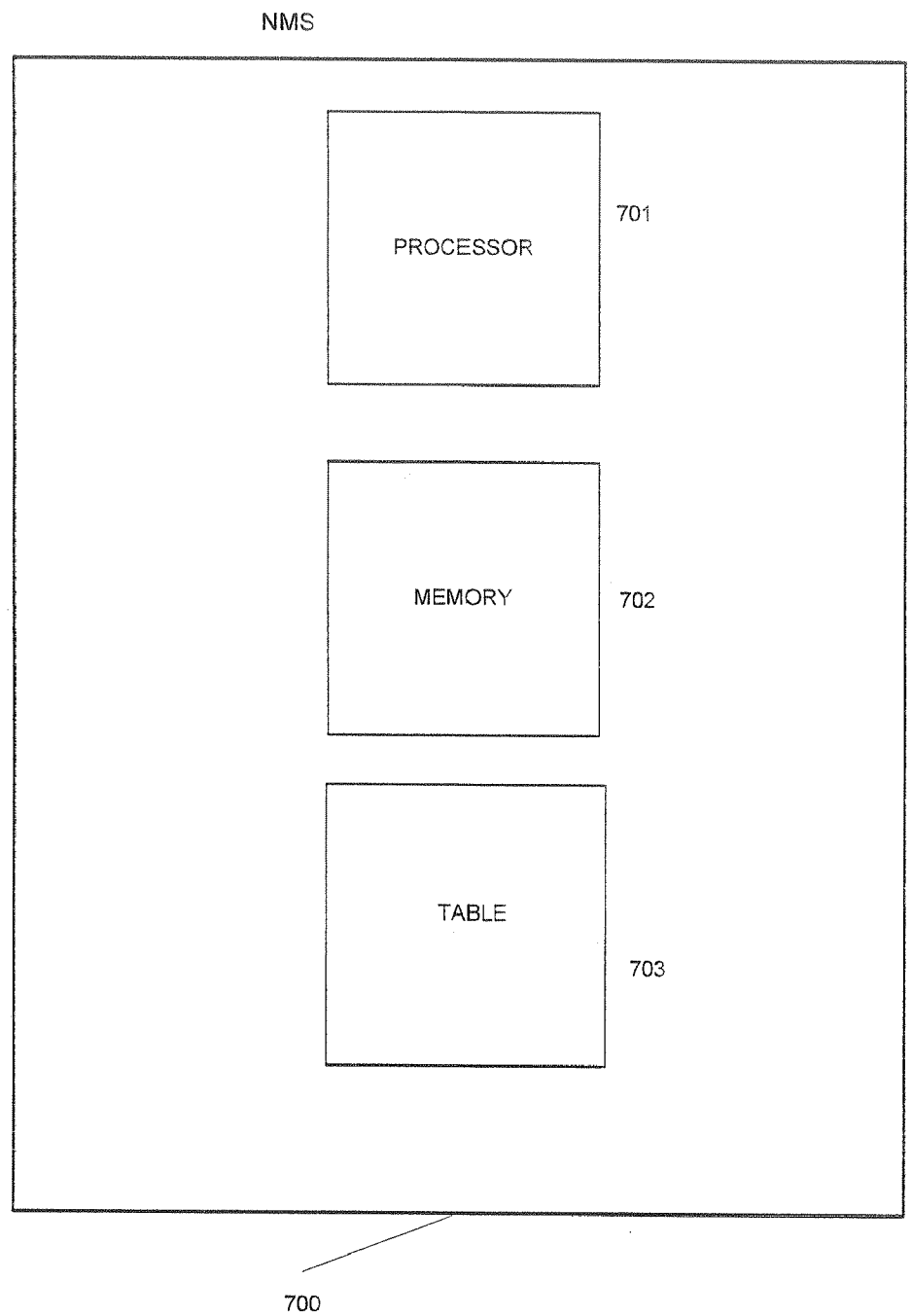
FIG. 7 is a diagram showing in more detail the NMS shown in FIGS. 2A, 3A, and 4.
Figure 8:
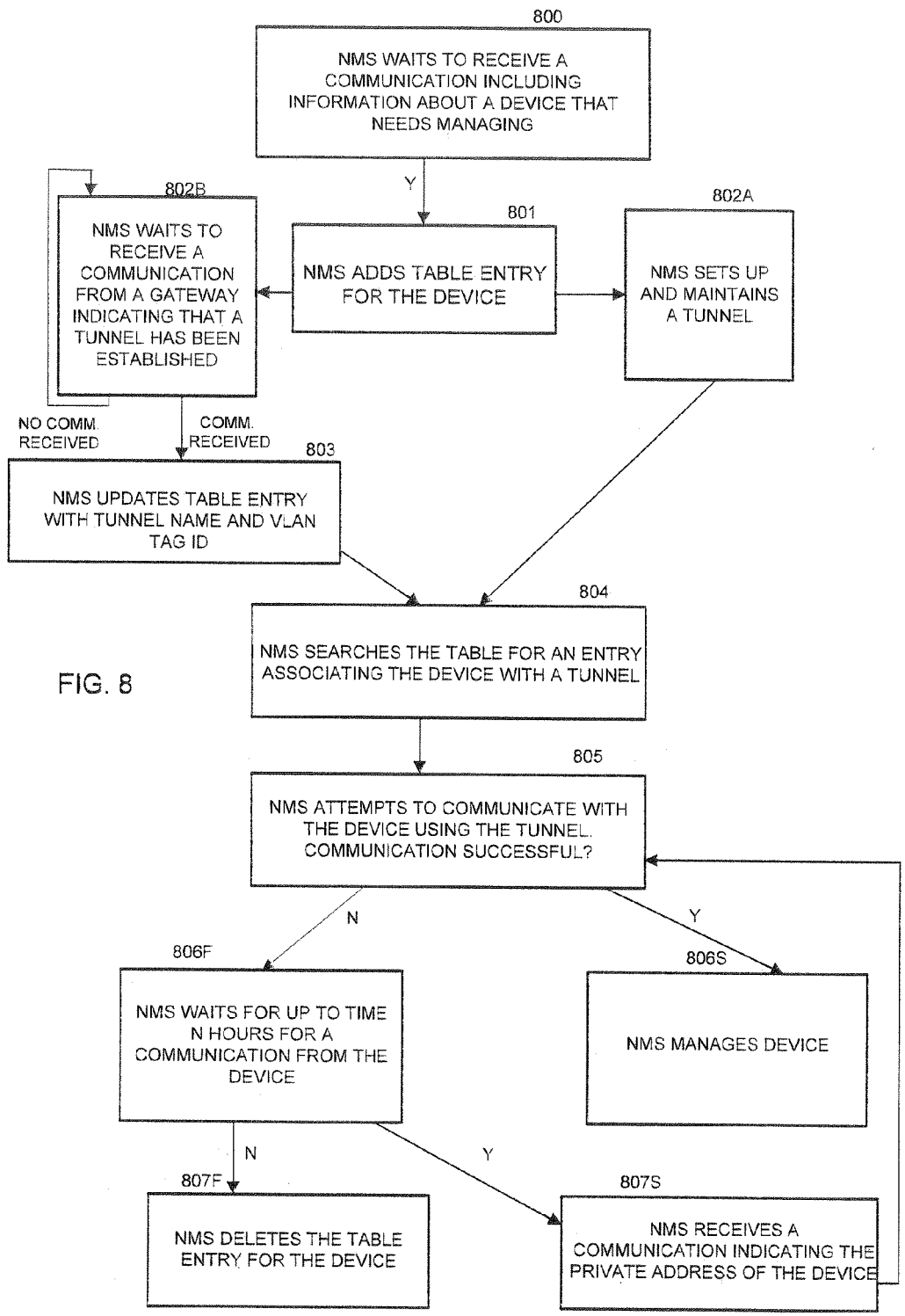
FIG. 8 is a flowchart showing how the NMS in FIG. 7 manages devices in a private network.

FIGS. 7 and 8 shows how the NMS 700 manages the device in the private network. The NMS 700 includes processor 701, memory 702 and table 703. The memory 702 includes instructions that, when executed by a processor, perform functions described in the flowchart of FIG. 8.

Referring to FIG. 8, the NMS 700 in block 800 waits to receive a communication containing information on a device that is being managed. When the communication is received, the NMS 700 adds a table entry for the device in block 801. The table entry includes a private device IP address, a public NAT IP address, and a unique device identifier.

At substantially the same time, the NMS 700 executes either the function in block 802A or the function in block 802B. In one embodiment, the NMS 700 executes the function in block 802A unless the resources required for setting up and maintaining tunnels are low, in which case the NMS 700 executes the function in block 802B.

In block 802A, the NMS 700 locally sets up and maintains a tunnel with the private network NAT for communicating with the device. Alternatively, in block 802B the NMS 700 waits to receive a communication from a gateway indicating that a tunnel has been established. In block 803, the NMS 700 updates the table entry for the device with the tunnel identifier and, if block 802B was used, a VLAN tag identifier.

In block 804, the NMS 700 needs to communicate with a device operating in the private network. The NMS 700 searches the table for an entry associating the device in the private network with a tunnel or a VLAN tag identifier. In block 805, the NMS 700 communicates with the device in the private network by sending a communication including the private device IP address to the tunnel endpoint. If the NMS 700 successfully contacts the device, the device is managed in block 806S.

If the NMS 700 fails to contact the device, the private device IP address in the table may not be the current private IP address for the device. The NSM 700 in block 806F waits a certain amount of time, for example, up to n hours, for the updated private device IP address to be sent by the device. If the correct private device IP address is received within n hours in block 807S, the NMS 700 uses the received revised IP address to communicate with the device in block 805. Optionally, if the NMS 700 fails to receive the correct private device IP address within n hours, the NMS 700 deletes the table entry for that device in block 807F.

Figure 9:
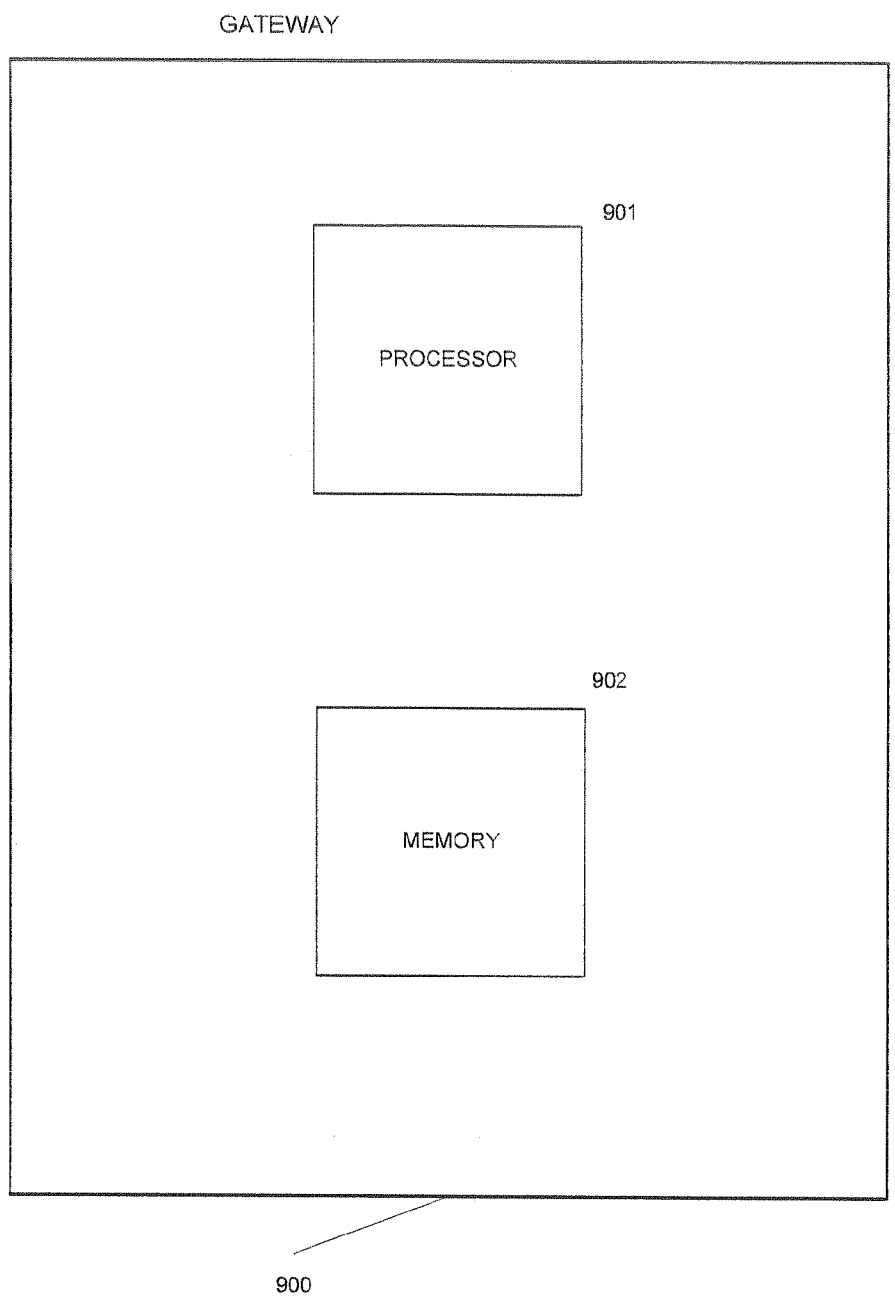
FIG. 9 is a diagram showing in more detail the gateway shown in FIG. 4.
Figure 10:
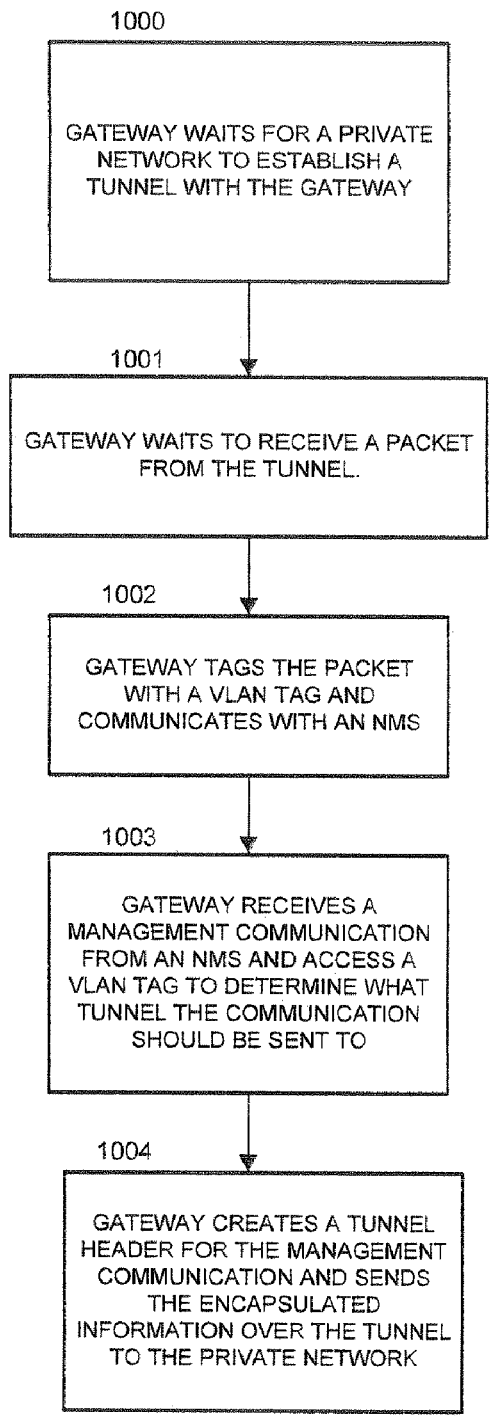
FIG. 10 is a flowchart showing how the gateway in FIG. 9 relieves the NMS of tunnel management.

Referring now to FIGS. 9 and 10, a gateway 900 for setting up tunnels to private networks is shown. The gateway 900 includes a processor 901 and a memory 902. The memory 902 includes instructions that, when executed by a processor 901, perform functions described in the flowchart of FIG. 10.

Referring to FIG. 10, in block 1000 the gateway 900 waits for a private network to establish a tunnel with the gateway 900. Once the tunnel has been established, the gateway 900 in block 1001 waits to receive a packet from the tunnel. When a packet is received, the gateway 900 tags the packet with a VLAN tag and sends the packet to an NMS based on a destination address of the packet.

The gateway 900 waits to receive a management communication from the NMS. When the management communication is received in block 1004, a VLAN tag will indicate that the management communication should be transported through a particular tunnel. The gateway 900 in block 1004 places the packet in a particular tunnel for encapsulation and transport to the indicated private network.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional block and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A system, comprising:
a table to map public Internet Protocol (IP) addresses for Network Address Translator (NAT) devices, private Internet Protocol (IP) addresses for private devices operating behind the NAT devices, and tunnel identifiers for tunnels extending to the NAT devices;
a processor configured to generate management instructions to be executed by a particular one of the private devices;
the processor configured to generate a first packet addressed to a particular one of the private IP addresses and insert the generated management instructions into a payload of the first packet;
the processor configured to generate a second packet addressed to a particular one of the public NAT IP addresses that the table maps to the particular one of the private IP addresses and insert the first addressed packet into a payload of the second addressed packet; and
the processor configured to transmit the second addressed packet over the tunnel corresponding to the particular tunnel identifier that the table maps to the particular addresses.

2. The system according to claim 1 wherein the processor is configured to receive globally unique device identifies for the private devices and then use the globally unique identifiers to track changes in IP address information associated with the private devices.

3. The system according to claim 1 wherein the processor is configured to establish and maintain the tunnels extending to each of the NAT devices.

4. A gateway, comprising:
a table configured to map tags to tunnels that originate from the gateway and terminate on a different one of a plurality of Network Address Translator (NAT) devices;
processor configured to extract a tag from a management communication transmitted from a Network Management System (NMS), wherein the management communication includes a first packet addressed to a private Internet Protocol (IP) address;
the processor configured to compare the extracted tag to the table to identify one of the tunnels;
the processor configured to insert the first addressed packet into a payload of a second tunnel packet and transmit the second tunnel packet, wherein the second tunnel packet is addressed to a particular one of the NAT devices that corresponds to the identified tunnel, said transmission over the identified tunnel to route management instructions included in a payload of the first addressed packet to a particular one of a plurality of private domains to cause the NAT device of the particular private domain to transmit the first addressed packet to an intended recipient within the particular private domain.

5. The gateway according to claim 4 wherein the tag is a Virtual Local Area Network (VLAN) tag.

6. A method for managing a device in a private network comprising:
receiving a communication including a public Network Address Translator (NAT) Internet Protocol (IP) address and a private device IP address;
storing the public NAT IP address and the private device IP address in a table thereby associating the device with a NAT;
setting up and maintaining a tunnel to the private network corresponding with the public NAT IP address, wherein the tunnel extends to the NAT and terminates on the NAT; and
using both the private device IP address and the NAT IP address to send management communications through the tunnel to the private network, wherein the management communications comprise a tunnel packet with a header addressed to the public NAT IP address and a payload containing a nested packet, wherein the nested packet includes a header addressed to the private device IP address and a payload containing management instructions.

7. The method according to claim 6 including:
updating the table with a new private device IP address or a new public NAT IP address received from the device operating in the private network; and
using the new private device IP address or the new public NAT IP address to access the device in the private network.

8. The method according to claim 6 including deleting a table entry associated with the private device IP address when the management communications to the private device IP address are not successful.

9. A method, comprising:
receiving a communication including a public Network Address Translator (NAT) Internet Protocol (IP) address and a private device IP address;
setting up and maintaining a tunnel to a private network corresponding with the public NAT IP address;
storing the public NAT IP address, the private device IP address, and an identifier for the tunnel in an entry in a table thereby associating the device therewith, wherein the table contains a plurality of entries each associating a public NAT IP address, a private device IP address, and a tunnel identifier;
responsive to receiving a request to manage a particular device, identifying one of the table entries corresponding to the particular device;
generating an inbound tunnel packet according to said identified table entry, the inbound tunnel packet having a tunnel header and a tunnel payload that includes an entire addressed packet, wherein the tunnel header is addressed to the public NAT IP address in the identified table entry and the addressed packet is addressed to the private device IP address in the identified table entry; and
inserting management instructions into a payload of the addressed packet and sending the tunnel packet having the inserted addressed packet with the management instructions inbound over the tunnel.

10. The method according to claim 9 including tagging the received communication with a Virtual Local Area Network (VLAN) tag before forwarding the communication to a Network Management System (NMS).

11. A method, comprising:
mapping identifiers to tunnels that terminate on different Network Address Translator (NAT) devices;
extracting an identifier from a received management communication, wherein the management communication includes a first packet addressed to a private Internet Protocol (IP) address and a payload containing management instructions;
identifying one of the tunnels according to the extracted identifier and generating a second tunnel packet according to the identified tunnel, wherein the second tunnel packet includes a tunnel header addressed to one of the NAT devices and a tunnel payload; and inserting the first packet into the tunnel payload of the second tunnel packet and forwarding the second tunnel packet over the identified tunnel, said transmission over the identified tunnel to deliver the management instructions to the private IP address.

12. The method of claim 11, wherein once of the management communication is received over the identified tunnel, the management communication can be unambiguously routed to the private IP address.

13. The method of claim 11 wherein the NAT device that terminates the identified tunnel strips the tunnel header prior to delivering the first packet to a recipient.

14. The method of claim 11 wherein the tunnel header operates at a same layer as a header of the first packet.

* * * * *

UNITED STATES PATENT AND TRADEMARK OFFICE
CERTIFICATE OF CORRECTION

| | | |
|---|---|---|
| PATENT NO. | : 7,706,371 B1 | Page 1 of 1 |
| APPLICATION NO. | : 11/177160 | |
| DATED | : April 27, 2010 | |
| INVENTOR(S) | : Wing et al. | |

It is certified that error appears in the above-identified patent and that said Letters Patent is hereby corrected as shown below:

At column 7, line 28, please replace "identifies" with --identifiers--.
At column 7, line 40, please replace "processor" with --a processor--.
At column 9, line 8, please replace "once of" with --once--.

Signed and Sealed this
Second Day of August, 2011

David J. Kappos
*Director of the United States Patent and Trademark Office*